United States Patent
Sodergard

Patent Number: 5,824,980
Date of Patent: Oct. 20, 1998

[54] SWITCH-ACTUATING, LIQUID-LEVEL SENSOR

[75] Inventor: Bengt Sodergard, Vasby, Sweden

[73] Assignee: ITT Flygt AB, Solna, Sweden

[21] Appl. No.: 669,829

[22] Filed: Jun. 26, 1996

Related U.S. Application Data

[63] Continuation of Ser. No. 489,574, Jun. 12, 1995, abandoned, which is a continuation-in-part of Ser. No. 268,890, Jun. 30, 1994, abandoned, which is a continuation-in-part of Ser. No. 40,689, Mar. 31, 1993, abandoned.

[30] Foreign Application Priority Data

Apr. 28, 1992 [SE] Sweden .................................. 9201303

[51] Int. Cl.$^6$ ................................................. H01H 35/18
[52] U.S. Cl. .......................................................... 200/84 R
[58] Field of Search ........................ 200/61.45 R, 61.47, 200/61.48, 61.51, 61.52, 61.53, 84 R, 84 A, 84 B

[56] References Cited

U.S. PATENT DOCUMENTS

| | | | |
|---|---|---|---|
| 3,864,538 | 2/1975 | Paradis et al. | 200/84 B |
| 4,084,073 | 4/1978 | Keener | 200/84 R |
| 5,089,676 | 2/1992 | Duncan | 200/84 R |

FOREIGN PATENT DOCUMENTS

| | | | |
|---|---|---|---|
| 2180495 | 11/1973 | France | H01H 35/00 |
| 2843484 | 7/1980 | Germany | H01H 35/18 |

Primary Examiner—Cassandra C Spyrou
Assistant Examiner—Michael A Friedhofer
Attorney, Agent, or Firm—Menotti J. Lombardi

[57] ABSTRACT

A closed, hollow body has a suspending and tethering, electrical cable joined thereto, the latter conducting electrical power to and from a microswitch confined within the body. A switch actuator is engaged and disengaged by a weight, within the body, the weight being pivotably supported therein, and having a center of gravity which is offset from a central, longitudinal axis of the sensor.

6 Claims, 2 Drawing Sheets

5,824,980

SWITCH-ACTUATING, LIQUID-LEVEL SENSOR

This is a continuation of prior application Ser. No. 08/489,574, filed on Jun. 12, 1995, entitled A SWITCH-ACTUATING, LIQUID-LEVEL SENSOR, ABD, which is a Continuation-in-Part of prior application Ser. No. 08/268,890, filed on Jun. 30, 1994, now abandoned, which is a Continuation-in-Part of prior application Ser. No. 08/040,689, filed on Mar. 31, 1993, now abandoned.

BACKGROUND OF THE INVENTION

This invention pertains to liquid-level sensors, and in particular to such sensors, used for measuring the level of a liquid in a tank, which generate signals for a remote equipment to cause various functions of the equipment. By way of example, such sensors are used in sewage pump stations for starting and stopping pumps, initiating alarms, and other such operations.

Prior art liquid-level sensors comprise free hanging, hollow and water-tight bodies which have a specified weight allocation so that the bodies will assume different angles, relative to the vertical, depending upon whether the bodies are freely suspended in air, or buoyantly supported in a liquid. Such sensors have a mercury switch confined therein which closes or opens an electrical circuit, depending upon the angular disposition of the body. Exemplary thereof is the level sensor disclosed in U.S. Pat. No. 3,183,323. This patented sensor is adequately efficient, however mercury is no longer environmentally acceptable in some applications.

The Swedish Patent Application 8405668-0 describes a level sensor in which the mercury switch has been replaced by a microswitch. The microswitch is actuated by a loose weight, within the sensor body, and the weight assumes different positions depending upon the angular disposition of the sensor. This approach is deemed not entirely reliable, mainly because of the strong currents which obtain in tanks of pump stations which subject the sensor to rough displacements. As a consequence thereof, the loose weight may get stuck in one of its varied dispositions and cause faulted functions as a result thereof.

The Swedish Patent 8405669-6 discloses another solution which comprises a microswitch within a sensor in which the sensor always assumes a vertical position. Again, as noted above, rough displacements of this sensor can cause erroneous, faulty functions.

The German Patent 270 6457 describes a solution where a material in powder form, having electrically-conductive abilities, is utilized for connecting and disconnecting conductors in a level sensor, while Swedish Patent 335 568 shows the use of a ball for the same purpose. As these devices are meant to float on the liquid surface, floating pollutions in the subject liquid may adhere to the sensor and, as a consequence thereof, cause the sensor to give faulty signals.

SUMMARY OF THE INVENTION

It is an object of this invention to set forth a switch-actuating, liquid-level sensor which contains no environmentally-injurious material, and which is so designed that it offers faultless operation even when it is exposed to heavy strain in its operational environment.

Particularly, it is an object of this invention to disclose a switch-actuating, liquid-level sensor comprising a closed, hollow body; electrical switching means, mounted within said body, operative for starting and stopping operation of a remote equipment; flexible cable means, coupled to said body, for (a) suspending said body therefrom and tethering said body therewith, and (b) conducting electrical power to and from said switching means; wherein said switching means has a movable actuator; and a balancing weight, pivotably mounted within said body in adjacency to said actuator, for disposition of said weight between first and second pivotably-effected attitudes within said body; wherein said weight has a surface which, upon said weight pivotably moving from one of said first and second attitudes to the other thereof, engages and moves said actuator, and upon said weight pivotably moving from said other attitude to said one attitude, disengages and removes from said actuator; said body has a longitudinal, central axis; and said weight has a center of gravity which is offset from said axis.

The aforesaid objects of this invention, as well as the novel features thereof, will become apparent by reference to the following description, taken in conjunction with the accompanying figures.

DESCRIPTION OF THE PREFERRED EMBODIMENT

Figure 1:
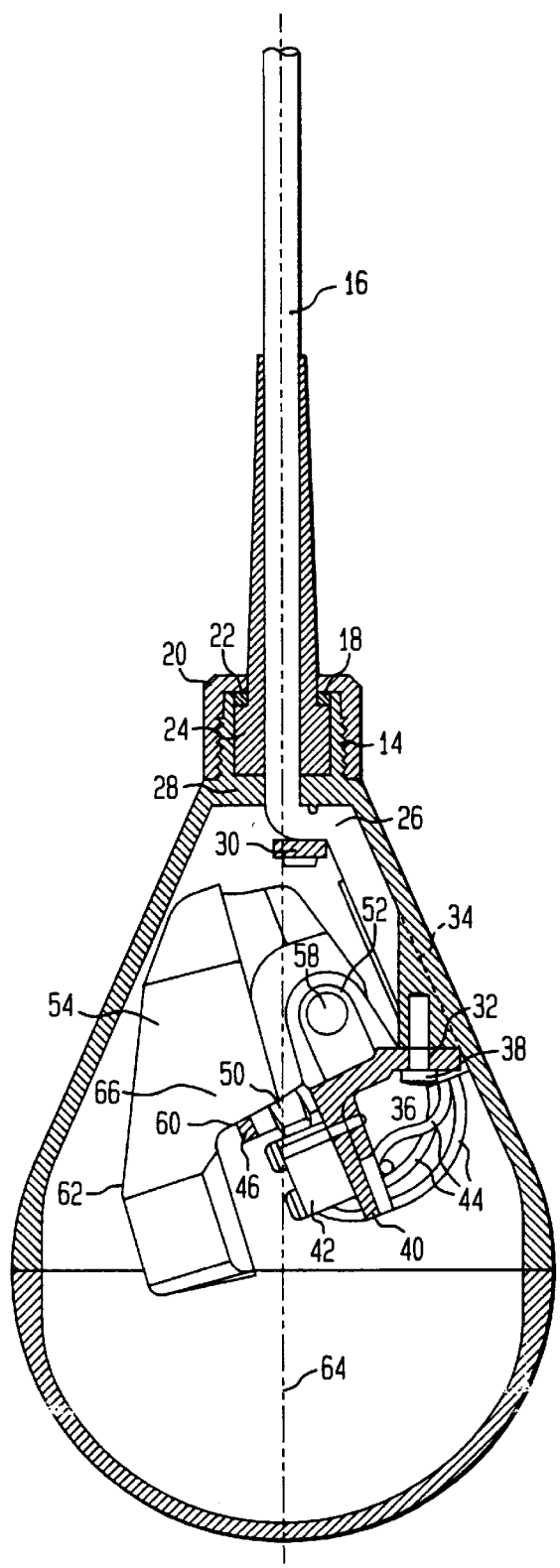
FIG. 1 is a vertical, partly cross-sectioned illustration of the novel sensor, according to an embodiment thereof, in which the sensor is freely suspended.

As shown in the figures, the novel sensor 10 comprises a closed, hollow body 12 having a threaded neck 14 which receives a flexible, electrical cable 16 therethrough. The cable 16 has a reinforcing sheath 18 with an end thereof nested in neck 14, and the neck is threaded, externally, and threadedly receives an internally-threaded cap 20. An annular seal 22 is interposed between the cap 20 and an enlarged portion 24 of the sheath 18.

Within the body 12, the cable 16 has a bight 26, and the latter is secured to an apertured, transverse portion 28 of the body 12 by means of a clamping plate 30. The body 12 has an inwardly-directed land 32 formed therein, and the same has a throughgoing hole 34 formed therein. The cable 16 is in penetration of the hole 34. A substantially right-angular bracket 36 is fastened to the land 32 by machine screws 38, and portion 40 of bracket 36 has a microswitch 42 fastened thereto. Electrical wires 44, extending from the cable 16, are coupled to terminals of the microswitch 42. The bracket 36 has a web 46 projecting therefrom, and the web has a void 48 formed therein. Microswitch 42 has an actuator 50 extending therefrom which penetrates the void 48.

The bracket 36 has a pair of apertured lugs 52 (only one is visible) extending therefrom in parallel. A balancing weight 54, having a transverse, pivot pin bore 56 formed therethrough, has the bore 56 aligned with the apertures in the lugs 52, and a pivot pin 58 penetrates the lugs 52 and the bore 56 pivotably to secure the weight 54 to the bracket 36. Weight 54 has a surface 60 which, as shown in FIG. 1, abuts the web 46. Further, in this disposition of the weight 54, the actuator 50 has been engaged by the surface 60 and moved, retractably, through the void 48.

Figure 2:
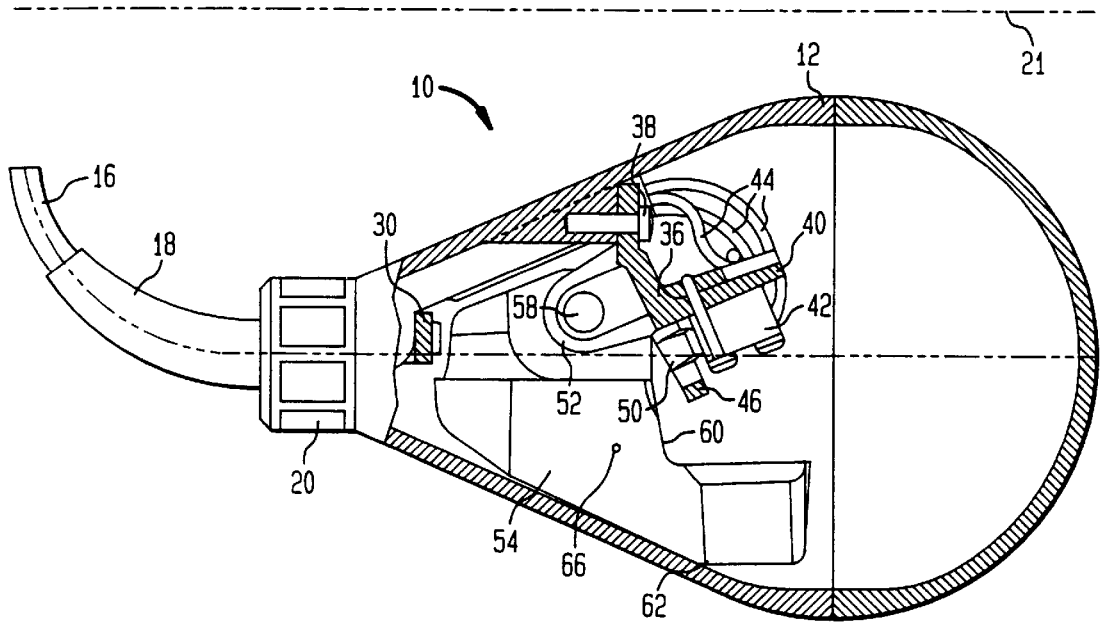
FIG. 2 is an illustration like that of FIG. 1, except that herein the sensor is horizontally disposed.
Figure 3:
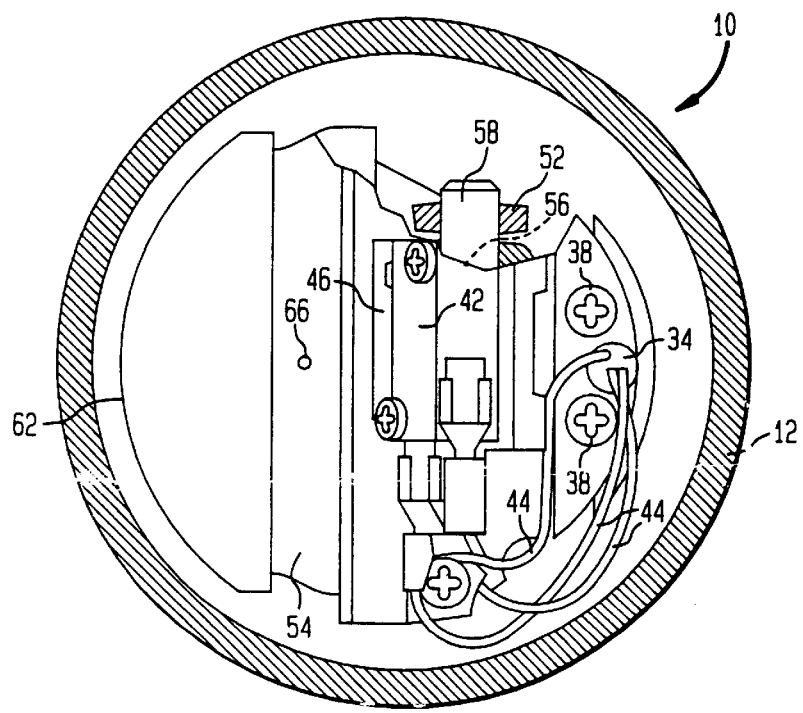
FIG. 3 is a view of the sensor taken along the section 3—3 of FIG. 1.

FIG. 2 depicts the sensor 10 as the same would be disposed, buoyantly, in a liquid body (line 21) Here, the weight 54 has pivoted until a side surface 62 thereof has engaged an inner surface of the body 12. Too, it will be seen that the surface 60 has disengaged and removed from the actuator 50. Consequently, the actuator 50 is free to extend beyond the void 48.

The sensor 10 has a longitudinal, central axis 64, and the center of gravity for the weight 54 is where indicated by the index number 66. In order to insure that the weight 54 will positively depress the actuator 50, when in the FIG. 1 disposition thereof, and will positively disengage and remove from the actuator when in the FIG. 2 disposition thereof, it is of relatively significant weight. To be certain that such aforesaid engagement and disengagement of the actuator 50 is effected, the weight 54 should constitute not less than thirty percent of the total weight of the sensor 10. A suitable range for the aforesaid is for the weight 54 to constitute between fifty percent to eighty percent of the total weight of the sensor 10. In any event, the measure of the weight shall be chosen with regard to the density of the liquid which is to be monitored to warrant that the sensor 10 will assume a substantially horizontal disposition, as shown in FIG. 2, when disposed in the liquid.

Self-evidently, the microswitch 42 can be employed to either turn on or off some remote equipment (not shown), when the actuator 50 thereof is depressed by surface 60 and/or disengaged by surface 60, or close a circuit to sound an alarm, or the like. The weight 54 is sturdy, and due to its mass will insure faultless operation regardless of fluid currents in which it is put to service.

While I have described my invention in connection with a specific embodiment thereof, it is to be clearly understood that this is done only by way of example, and not as a limitation to the scope of the invention, as set forth in the objects thereof and in the appended claims.

I claim:

1. A switch actuating, liquid-level sensor, for disposition in a liquid and having a balancing weight which is positioned and retained in one or another attitude solely in dependence on the liquid-level and gravity comprising in combination:

a closed, hollow body having an externally threaded neck;

electrical switching means, mounted within said body, operative for starting and stopping operation of a remote equipment;

a flexible cable coupled to said body through said neck, for (a) suspending said body therefrom and tethering said body therewith, and (b) conducting electrical power to and from said switching means; wherein said cable has a reinforcing sheath with an end thereof nested in said neck, said neck threadedly receives an internally-threaded cap and an annular seal is interposed between said cap and an enlarged portion of said sheath;

said weight between first and second pivotably-effected attitudes within said body; wherein said weight has an actuator surface which, upon said weight pivotably moving from one of said first and second attitudes to the other thereof, engages and moves said actuator, and upon said weight pivotably moving from said other attitude to said one attitude, disengages and removes from said actuator;

said body has a longitudinal, central axis in-line with said neck, and said weight has a side surface which engages an inner surface of said body, when said weight is in said one attitude, to delimit pivotable movement of such weight;

said weight is irregularly shaped and has a center of gravity which is offset from said axis and located nearer said actuator surface than said side surface; wherein said sensor has a given total weight, and said balancing weight comprises not less than thirty percent of said total weight, such that said sensor body will assume a substantially horizontal disposition along its longitudinal central axis when disposed buoyantly, in a liquid body;

said body has an inwardly-directed land formed therein;

a bracket is fastened to said land, and said switching means is fastened to said bracket;

said bracket has a pair of apertured lugs, extending therefrom in parallel;

said weight has a bore hole formed therethrough; and a pivot pin, in penetration of said apertured lugs and said bore hole, pivotably mounts said weight to said bracket.

2. A switch actuating, liquid level-sensor, for starting and stopping remotely connected equipment, comprising:

electrical switching means for starting and stopping remotely located equipment; said switching means having a movable actuator;

a hollow body which encloses said electrical switching means, said hollow body having a neck for enabling said electrical switching means to be electrically coupled to the remotely located equipment; wherein said neck of said body includes an externally located thread and further comprising a flexible cable coupled to said body through said neck, for (a) suspending said body therefrom and tethering said body therewith, and (b) conducting electrical power to and from said switching means; wherein said cable has a reinforcing sheath with an end thereof nested in said neck, said neck threadedly receives an internally-threaded cap and an annular seal is interposed between said cap and an enlarged portion of said sheath; and a balancing weight having pivot means for pivotably mounting said weight within said body, said pivot means positioned between said neck and said switching means, said weight retained in one of a first and second pivotably-effected attitudes within said body solely in dependence on the liquid-level and gravity of said sensor;

wherein said switching means includes a movable actuator and said weight includes an actuator surface, said actuator surface of said weight engaging said actuator when said weight is in said first attitude and disengaging said actuator when said weight pivotably moves into said second attitude, said weight having a side surface which engages an inner surface of said body when said weight is in said second attitude to delimit pivotable movement of said weight.

3. A switch actuating, liquid level-sensor according to claim 2 wherein said body has a longitudinal, central axis inline with said neck and said weight is irregularly shaped and has a center of gravity which is offset from said central axis of said body and located nearer said actuator surface than said side surface.

4. A switch actuating, liquid level-sensor according to claim 3, wherein said sensor has a given total weight, and said balancing weight comprises not less than thirty percent of said total weight, such that said sensor body will assume a substantially horizontal disposition along said longitudinal central axis when disposed buoyantly, in a liquid body.

5. A switch actuating, liquid level-sensor according to claim 2, wherein said body has an inwardly-directed land formed therein and further comprising a bracket attached to said land, said switching means being fastened to said bracket.

6. A switch actuating, liquid level-sensor according to claim 5, wherein said bracket includes a pair of parallel extending apertured lugs, and said pivot means includes a borehole formed through said weight and a pivot pin penetrating said apertured lugs.

* * * * *